US012018920B2

(12) United States Patent
Kololuoma et al.

(10) Patent No.: US 12,018,920 B2
(45) Date of Patent: Jun. 25, 2024

(54) MULTI-SPECTRAL ARTIFICIAL TARGET DEVICE AND A METHOD FOR PRODUCING THE SAME AS WELL AS A METHOD OF GENERATING A THERMAL AND RADAR SIGNATURE OF AN OBJECT WITH AN ARTIFICIAL TARGET DEVICE

(71) Applicant: Dobbelgänger Oy, Oulu (FI)

(72) Inventors: Terho Kololuoma, Espoo (FI); Arttu Huttunen, Espoo (FI)

(73) Assignee: Dobbelgänger Oy, Oulu (FI)

( * ) Notice: Subject to any disclaimer, the term of this patent is extended or adjusted under 35 U.S.C. 154(b) by 0 days.

(21) Appl. No.: 18/107,531

(22) Filed: Feb. 9, 2023

(65) Prior Publication Data

US 2023/0384064 A1 Nov. 30, 2023

Related U.S. Application Data

(63) Continuation of application No. 16/911,418, filed on Jun. 25, 2020, now Pat. No. 11,604,049.

(51) Int. Cl.
*F41J 2/02* (2006.01)
*F41H 3/02* (2006.01)
*H01Q 1/38* (2006.01)

(52) U.S. Cl.
CPC .................. *F41J 2/02* (2013.01); *F41H 3/02* (2013.01); *H01Q 1/38* (2013.01)

(58) Field of Classification Search
None
See application file for complete search history.

(56) References Cited

U.S. PATENT DOCUMENTS

| | | | |
|---|---|---|---|
| 3,300,781 | A | 1/1967 | Clough et al. |
| 4,524,386 | A | 6/1985 | Scott |
| 4,546,983 | A | 10/1985 | Rosa |
| 4,659,602 | A | 4/1987 | Birch |
| 5,077,101 | A | 12/1991 | Conway et al. |
| 5,265,958 | A | 11/1993 | Ludlow |
| 8,340,358 | B2 | 12/2012 | Cincotti et al. |

(Continued)

FOREIGN PATENT DOCUMENTS

| | | | |
|---|---|---|---|
| DE | 3643692 | A1 | 3/1992 |
| FR | 2716962 | A1 | 9/1995 |

(Continued)

*Primary Examiner* — Bernarr E Gregory
(74) *Attorney, Agent, or Firm* — Laine IP Oy

(57) ABSTRACT

It is herein proposed a novel multi-spectral artificial target device for producing a deceptive thermal and radar signature of an object. The device features a multi-layer structure with a substrate and a functional thermal signal layer, which is provided directly or indirectly on the substrate. The substrate is made of pliable material which is capable of being shaped on a frame. The thermal signal layer includes electrically conductive material such arranged to form an array of independently controlled thermal elements for outputting a thermal signal, which is observable in the infra-red spectrum, upon exposure to a control voltage. The multi-layer structure further includes a functional radar signal layer, which is provided directly or indirectly onto the substrate. The radar signal layer outputs a radar response signal, which is observable in the radio frequency spectrum, upon exposure to an external radar stimulus or excitation.

12 Claims, 8 Drawing Sheets

(56) References Cited

U.S. PATENT DOCUMENTS

| | | | |
|---|---|---|---|
| 9,312,605 | B2 | 4/2016 | Sjölund |
| 11,604,049 | B2 * | 3/2023 | Kololuoma ............. H01Q 1/38 |
| 2007/0013137 | A1 | 1/2007 | Andren et al. |
| 2007/0268173 | A1 | 11/2007 | Randy |
| 2008/0296842 | A1 | 12/2008 | Novak et al. |
| 2011/0147369 | A1 | 6/2011 | Spooner et al. |

FOREIGN PATENT DOCUMENTS

| | | | |
|---|---|---|---|
| FR | 3005285 | A1 | 11/2014 |
| FR | 3005286 | A1 | 11/2014 |

* cited by examiner

MULTI-SPECTRAL ARTIFICIAL TARGET DEVICE AND A METHOD FOR PRODUCING THE SAME AS WELL AS A METHOD OF GENERATING A THERMAL AND RADAR SIGNATURE OF AN OBJECT WITH AN ARTIFICIAL TARGET DEVICE

FIELD

The present disclosure relates to artificial target devices emitting infrared radiation. This application is a continuation of U.S. patent application Ser. No. 16/911,418, filed on Jun. 25, 2020, now U.S. Pat. No. 11,604,049.

BACKGROUND

Artificial target devices of various sorts are used in military operations and training as well as in hunting and shooting practice to mimic a particular target. In target practice artificial targets may simply take the form of a dummy shaped and painted to resemble the target. Simple examples of such dummies include a plastic duck or a cardboard cut into the shape of an off-road vehicle. Dummies are also used to distract the enemy in combat by placing artificial targets in the field to steer offensive actions away from the actual troops.

Such artificial targets can be quite sophisticated in that they are constructed as actively transmitting devices for drawing attention to them. With modern combat increasingly involving machine-assisted vision, so too do artificial targets. Dummies have been developed to transmit infra-red signals to mimic the thermal signature of a military asset, such as a tank, so as to be detected by a heat-seeking missile, for example. Several different techniques have been developed for this purpose, including blowing hot air into an inflatable dummy.

Actively transmitting dummies have, however, traditionally only been able to produce a relatively coarse thermal signature. An improvement to the fidelity of thermal images is disclosed in U.S. Pat. No. 4,524,386 A, wherein it is proposed to produce a thermal image with individually controlled active thermal elements disposed in an array to provide a re-production of a pixelated image of the target.

While such known systems are useful in producing relatively accurate thermal signatures, dummies must be very realistic to convince modern military vehicles equipped with advanced sensors aided by artificial intelligence. It is therefore an object of the present invention to improve the deceptive properties of known artificial targets or at least provide the public with a useful alternative.

SUMMARY

According to a first aspect, there is proposed a novel multi-spectral artificial target device for producing a deceptive thermal and radar signature of an object. The device features a multi-layer structure with a substrate and a functional thermal signal layer, which is provided directly or indirectly on the substrate. The thermal signal layer includes electrically conductive material such arranged to form an array of independently controlled thermal elements for outputting a thermal signal, which is observable in the infra-red spectrum, upon exposure to a control voltage. The multi-layer structure further includes a functional radar signal layer, which is provided directly or indirectly onto the substrate. The radar signal layer outputs a radar response signal, which is observable in the radio frequency spectrum, upon exposure to an external radar stimulus or excitation.

According to a second aspect, there is proposed a method of producing a multi-spectral artificial target device for producing a deceptive thermal and radar signature of an object. The involves the following activity:

- providing a multi-layer structure, wherein a substrate is provided and wherein a thermal signal layer is provided by depositing electrically conductive material onto the substrate to form an array of independently controlled thermal elements;
- providing a radar signal layer, wherein a metallic film is provided, an adhesive film is provided onto the substrate, the thermal signal layer, or onto the metallic film, and the metallic film is laminated onto the substrate or onto the thermal signal layer through the adhesive film Various embodiments of the first aspect may comprise at least one feature from the following itemized list:

- the thermal elements in the array are arranged in a matrix-like pattern;
- The substrate is made of pliable material which is capable of being shaped on a frame;
- the substrate comprises a pliable layer comprising a polymer surface material;
- the polymer surface material is PET;
- the thermal signal layer is patterned to include electrically resistive elements to provide for the array of thermal elements;
- the thermal signal layer comprises additional electrically resistive elements between sections of the electrically conductive material to provide for the array of thermal elements;
- the radar signal layer is patterned to match the pattern of thermal elements on the thermal signal layer;
- each thermal element comprises a first electrode and a second electrode, wherein the first electrode and the second electrode are connected by the electrically resistive element;
- the thermal signal layer comprises electrically non-conductive sections between thermal elements;
- the structure comprises a driving layer, which is provided directly or indirectly on a side of the substrate opposing the thermal signal layer, comprising an electrically conductive lead;
- the structure comprises a conductor, which extends through the substrate and provides an electrical connection between the lead and the thermal signal layer;
- the conductor comprises a plurality of electrically conductive channels extending through the substrate such patterned to provide for the array of thermal elements;
- the conductor comprises electrically conductive material embedded into the substrate material;
- the radar signal layer comprises a metallic film that has a radar reflectance different to that of the thermal signal layer or substrate or both;
- the structure comprises a visual deception layer provided onto the radar signal layer;
- the artificial target device comprises one or more such multi-layer structures;
- the artificial target device comprises a frame for supporting said one or more structures;
- the artificial target device comprises control circuitry which is configured to individually control the temperature of the plurality of thermal elements in the structure(s);
- the method of depositing is printing.

the provision of the thermal signal layer comprises patterning the electrodes—and optionally the electrically resistive element—onto the thermal signal layer through subtraction, particularly mechanical or chemical subtraction;

the provision of the multi-layer structure comprises providing a visual deception layer onto the radar signal layer, the method comprises providing a frame and attaching the multi-layer structure onto the frame.

Considerable benefits may be gained with aid of the present proposition. The additional functional radar signal layer renders the artificial target device multi-spectral in the sense that it is able to produce not only the thermal signature of the portrayed target but also the radar signal as well. Accordingly, the device may be used to deceive advanced equipment scanning the surrounding in infra-red and radio frequency spectrums. By incorporating the functional layers in a single multi-layer structure means that a frame, which is constructed to resemble the 3D shape of the portrayed object, may be clad with the multi-layer structure to add the thermal and radar traces of the object to a realistic shape.

According to one embodiment the functional layers are constructed as separate physical layers, which provides the additional effect of gaining a degree of freedom to fine-tune the radar appearance properties and the thermal signature independently from one another. Indeed, a single artificial target device may include sections that provides weaker radar responses and sections that provide stronger radar responses to mimic objects with similar properties.

BRIEF DESCRIPTION OF THE DRAWINGS

In the following certain exemplary embodiments are described in greater detail with reference to the accompanying drawings, in which.

EMBODIMENTS

Definitions

In the present context the expression "artificial target device" includes, but is not limited to, decoy devices for imitating objects, particularly military assets, and dummies for targeting practice.

In the present context the expression "array" includes, but is not limited to, an ordered series or arrangement.

Figure 1:
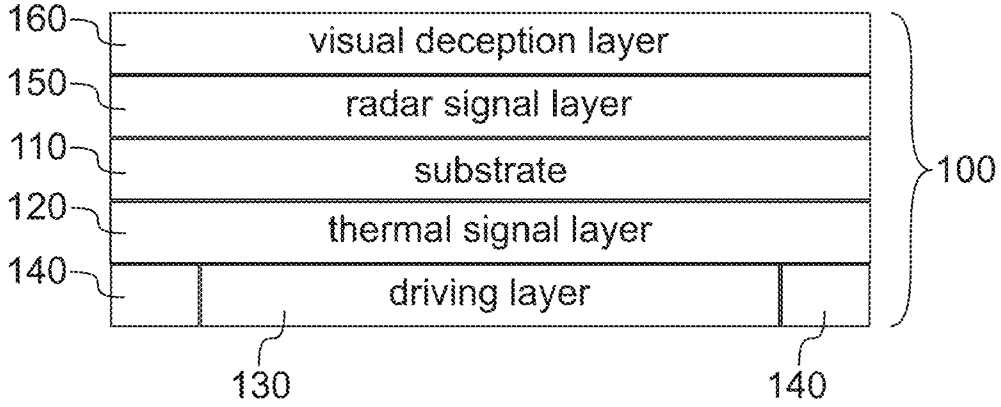
FIG. 1 illustrates a schematic cross-sectional view of a section of a multi-layer structure in accordance with at least some embodiments of the present invention.

FIG. 1 illustrates a schematic representation of a cross-section of an exemplary multi-layer structure 100 employed in an artificial target device according to one embodiment. The multi-layer structure 100 features a substrate 110 on which several layers are provided to produce a multi-spectral signature of a target. The substrate 110 may be made of a pliable material which can be bent around a frame to resemble the three-dimensional shape of the portrayed object. The substrate 110 may include a base material that is coated with another material or it may have a uniform structure. According to one embodiment the substrate 110 is made of a polymer material. According to another embodiment the substrate 110 includes a polymer coating. According to a particular embodiment the substrate 110 consists substantially of or has a coating made of polyethylene terephthalate (PET), Polyethylene naphthalate (PEN), polyethylene (PE), polypropylene (PP), Polyimide (PI). If a polymer-based substrate 110 is used, a suitable material thickness may be in the range of 10 to 500 fun, particularly 50 to 250 μm, especially 125 μm. Alternatively, the substrate 110 may include a fibrous base, such as Kevlar or glass-fiber or carbon-fiber base, with or without a polymer coating. If a fiber-based substrate 110 is used, a suitable basis weight may be 50 to 500 $g/m^2$, particularly 80 to 350 $g/m^2$, particularly 100 to 200 $g/m^2$, such as 150 $g/m^2$. Other examples include board, paper, or fabric. Generally speaking it is advantageous to construct the substrate 110 of a non-metallic material so as to prevent interference between other layers which will be discussed in the following. Alternatively the substrate may be made from a basic printed circuit board (PCB) or printed wiring board (PWB) material, such as laminated layers of fiber, such as fiberglass, cloth or paper, with thermoset resin. If the multi-layer structure is constructed from a relatively rigid material, it may form part of the frame. Conversely, the frame may perform some of the functions of the device, such as a supplement the radar response.

The substrate 110 is layered with a functional radar signal layer 150. In this context a "functional radar signal layer" refers to a physical layer that has the capability of producing a radar response signal, when exposed to an incident radar wave. As will become apparent here after, several functional layers may be provided with several physical layers or a single physical layer. According to the embodiment of FIG. 1, the radar signal layer 150 is provided for by a separate physical layer.

To be effective, the reflective radar emission produced by the radar signal layer 150 is observable in the radio frequency spectrum. The radar signal layer 150 is made of a metallic material that has enough thickness to produce a radar response. The radar signal layer 150 has a suitable thickness in the range of 1 to 100 μm, particularly 5 to 50 μm, more particularly 10 to 20 μm, especially 15 μm. With a thick enough layer, the radar signal layer 150 is set to provide for sufficient penetration depth (skin depth) for incident radar waves. For example, if the radar signal layer 150 is constructed from copper, or an alloy consisting predominantly of copper, a practical penetration depth would be about 3 μm for radar waves emitted at 300 MHz. A comparable penetration depth for aluminium, or an alloy consisting predominantly of aluminium, would be about 4 μm. In particular, the radar signal layer 150 has radar reflectance which is different to that of the thermal signal layer 120 or substrate 110 or both the thermal signal layer 120 and the substrate 110. The radar signal layer 150 has preferably radar reflectance which is greater than, that of the thermal signal layer 120 or substrate 110 or both the thermal signal layer 120 and the substrate 110. In the present context the radar reflectance refers to the effectiveness of a layer in reflecting radiant energy. It is the fraction of incident electromagnetic power that is reflected at an interface. The reflectance is dependent on the wavelength of the incident radiation.

According to one embodiment the separate radar signal layer 150 is patterned such to match the shape and pattern of the thermal elements 200 on the thermal signal layer 120. Accordingly, the radar signal layer comprises small gaps in the layer similarly to the small gaps between the thermal elements 200 shown in FIG. 6. If the gap is made relatively small, for example 1 mm, the gaps will not be observed by a radar. The gaps prevent heat transfer between adjacent thermal elements, but the gaps even out the heat distribution within the thermal element 200.

The deceptiveness of the multi-layer structure 100 may be further increased by providing a visual deception layer 160 as the outermost layer. The visual deception layer 160 includes a simple coat of paint or it may comprise a projection screen for displaying a projected image of the portrayed object. The color and pattern of the paint is selected to imitate the portrayed object and may be applied with a brush, spray gun, printing, or laminating, for example. The visual deception layer 160 may additionally include letters and/or numbers to deceive character recognition software on a hostile craft. An examples of such an application is a license plate when portraying a vehicle. If a projection screen is provided, the material of the visual deception layer 160 is selected to provide enough gain for the image production. Suitable painting methods and projector screens are known per se. The visual deception layer 160 is optional especially if the outermost layer in the multi-layer structure 100, which ever layer it may be, has an appearance which is close enough to the portrayed object.

FIG. 1 further shows a functional thermal signal layer 120 constructed as a separate physical layer on the substrate 110. In this context a "functional thermal signal layer" refers to a physical layer that has the capability of outputting a thermal signal, which is observable in the infra-red spectrum. As will become apparent here after, several functional layers may be provided with several physical layers or a single physical layer. According to the embodiment of FIG. 1, the thermal signal layer 120 is provided for by a separate physical layer. According to this particular embodiment the thermal signal layer 120 is provided on a side of the substrate 110 which is opposite to the radar signal layer 150.

The thermal signal layer 120 may be constructed by a number of different configurations that are shown in FIGS. 2 to 8. Regardless of the configuration the thermal signal layer 120 may particularly be constructed of a relatively thin layer of conductive material deposited onto the substrate 110. Suitable materials for the thermal signal layer 120 include carbon, metals, based on particles fibers, sheetlets or bulk metal. The material thickness may be in the range of from tens of nanometers to hundreds of micrometers depending on material used; thicker for materials having lower conductivity such as ink based metal layers or carbon based materials. To produce distinguishable temperature gradients in respect to the ambient, the attainable resistance for the layer or parts thereof is in the range of 5 to 15 ohm, whereby relatively low voltages may be used. The resistance of the layer is affected by the thickness, area, and material of the layer.

Several alternative methods are available for depositing the thermal signal layer 120 onto the substrate 110. The deposition may be made on an atomic level through atomic layer deposition (ALD) or on a coarser lever, e.g. printing an ink containing material particles or by laminating the foil. Further alternatives include sputtering, chemical vapor deposition (CVD), pulsed laser deposition (PLD), and several other techniques aimed at producing very thin membranes. Relatively thick layers may be produced by painting with brush or spray application, for example. According to one embodiment the thermal signal layer 120 is printed onto the substrate 110. Suitable printing methods include offset, flexo, gravure, screen printing, rotary screen printing, ink-jet-printing, dispensing. According to another embodiment the thermal signal layer 120 may be provided onto the substrate 110 by using various coating methods, such as slot-die coating, blade-coating, reverse offset coating, extrusion and lamination.

The material of the thermal signal layer 120 is patterned to provide for an array of independently controlled thermal elements 200. The thermal elements 200 are used as thermal pixels or parts that, when controlled individually to emit a particular infra-red signal, collectively make up the pursued thermal signature. The patterning may be achieved by subtracting parts of the deposited layer of conductive material or by adding the desired pattern during deposition. Suitable methods for subtractive patterning include wet-etching, dry-etching, kiss- and die cutting, laser processing.

Figure 6:
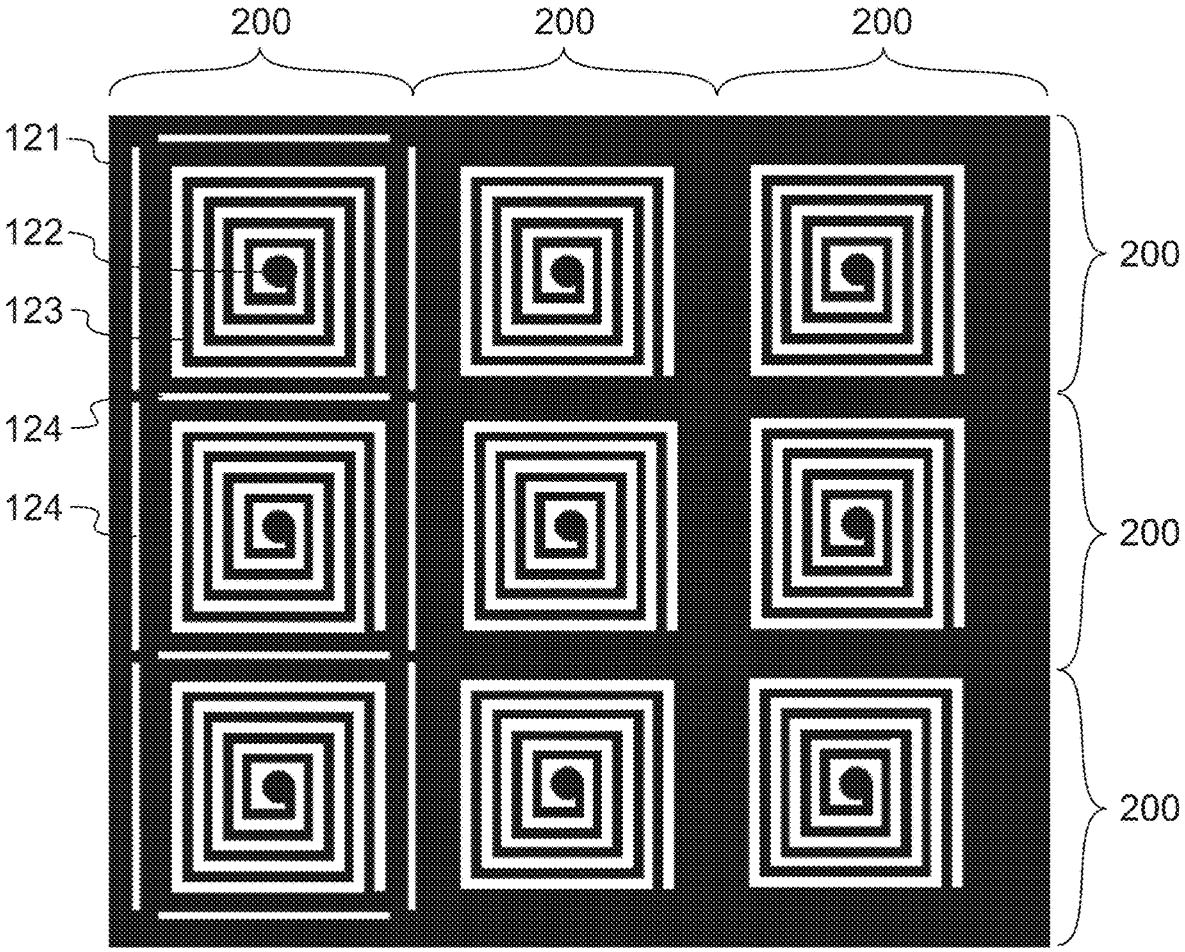
FIG. 6 illustrates a top elevation view of the multi-layer structure of FIG. 2.

FIG. 6 shows an exemplary array of nine thermal elements 200 arranged in a matrix-like pattern of three-by-three. Each thermal element 200 includes a first electrode 121 and a second electrode 122 with an electrically resistive element 123 there between. In the example of FIG. 6, the elements 121, 122, 123 are all made of the same material that forms the thermal signal layer 120. The electrically resistive element 123 is constructed by patterning the material of the thermal signal layer 120 into a "labyrinth" or angled or curved spiral shape that extends between two strips of the same material, namely the first and a second electrode 121, 122. In illustrated example the thermal elements 200 share the first electrode 121 which frames the elements. The second electrode 122, however, is individual for each thermal element 200 at the center of the thereof. The thermal elements 200 further include strips of electrically non-conductive sections 124 between thermal elements 200 to minimize heat transfer between thermal elements 200. The non-conductive sections 124 may simply be voids in the electrically conductive material that forms the thermal signal layer 120, whereby the substrate or a coating thereof may be exposed at the non-conductive sections 124.

Figure 7:
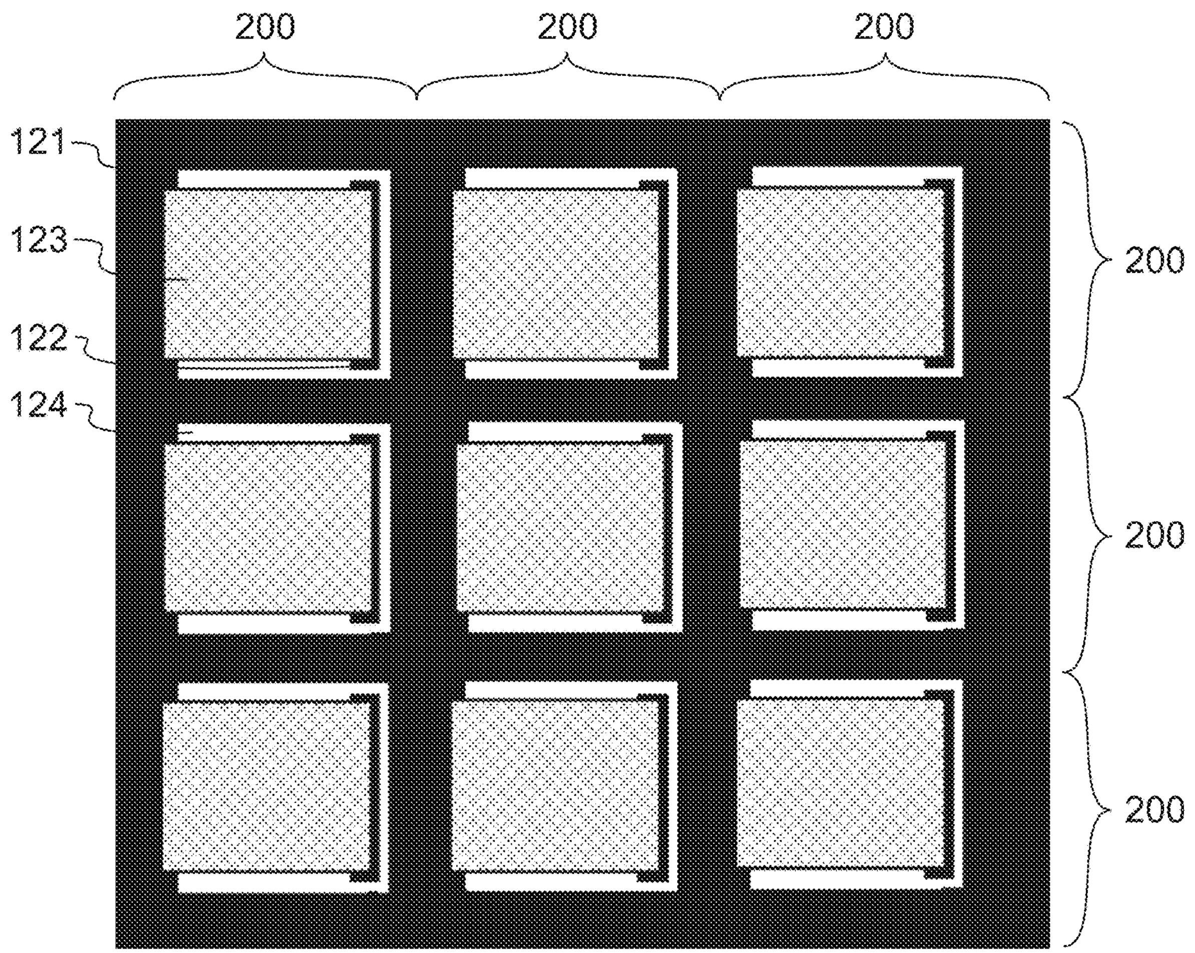
FIG. 7 illustrates a top elevation view of the multi-layer structure of FIG. 3.

FIG. 7 shows an alternative embodiment of the construction of FIG. 6. The thermal signal layer 120 of FIG. 7 comprises separate electrically resistive elements 123 between sections of the electrically conductive material, i.e. connecting the first and a second electrode 121, 122. The electrically resistive elements 123 may take the form of a piece of material that has conductivity smaller than that of the surrounding electrode 121, 122. According to a particular embodiment the electric conductivity of the electrically resistive element 123 is smaller than $1.43*10^{-7}$ S/m. The electrically resistive elements 123 may be printed or otherwise overlaid onto the electrode(s) 121, 122. It is to be noted that the resistance over the electrically resistive elements 123 is greater than that across the first and/or second electrode 121, 122. The difference in resistance may be a decade or more, such as hundred times or more. In the illustrated embodiment the electrically resistive elements

123 are surrounded by non-conductive sections 124 to isolate the first and a second electrode 121, 122 from each other.

Figure 8:
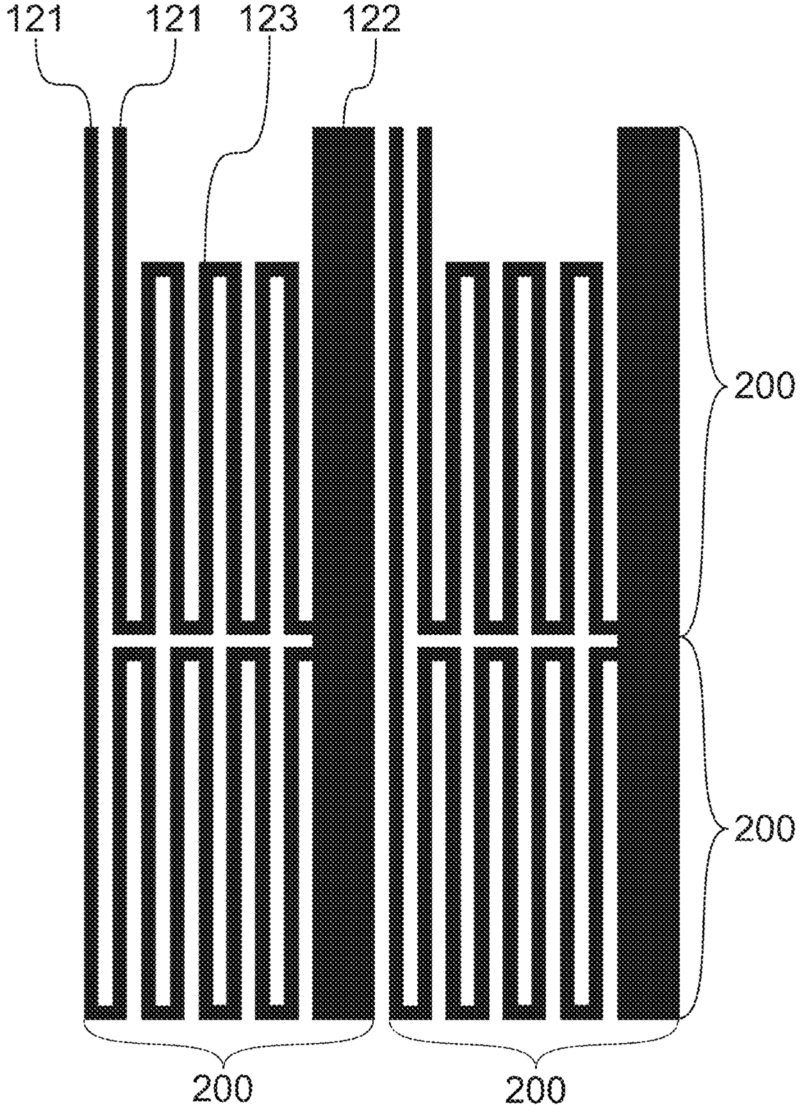
FIG. 8 illustrates a top elevation view of the multi-layer structure according to an alternative embodiment.

FIG. 8 shows a variant of the embodiment of FIG. 6. FIG. 8 is an illustration featuring a two-by-two configuration of a larger array of thermal elements 200. Instead of a winding shape shown in FIG. 6, the electrically resistive element 123 may be shaped to meander between the electrodes 121, 122. In the illustrated example, the adjacent thermal elements 200 in a given column share the second electrode 122, whereas each thermal element 200 has an individual first electrode 121.

Indeed, the thermal elements 200 may be patterned in several different ways. The thermal elements 200 may also be constructed in a host of different configurations, as illustrated by FIGS. 2 to 5.

Figure 2:
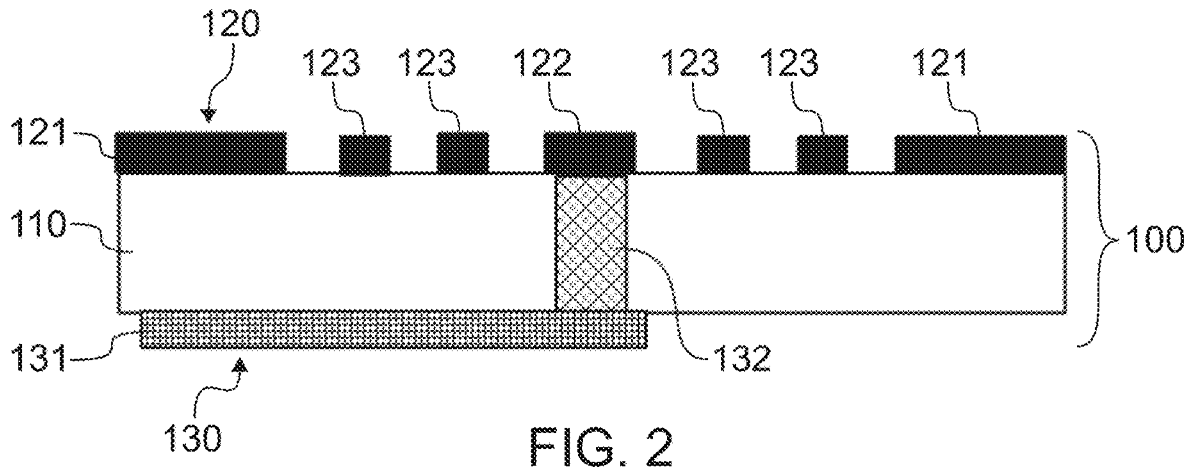
FIG. 2 illustrates a schematic cross-sectional view of a section of a multi-layer structure in accordance with at least some embodiments of the present invention.

According to the embodiment shown in FIG. 2, which is the schematic cross-sectional illustration of FIG. 6, the thermal signal layer 120 is deposited onto the substrate 110. FIG. 2 shows the first electrode 121 occupying the periphery of the substrate 110, the second electrode 122 in the middle, and the windings of the electrically resistive element 123 between the first and second electrode 121, 122. The thermal signal layer 120 is powered by a driving layer 130 on the opposite side of the substrate 110. The driving layer 130 has an electrically conductive lead 131 for providing voltage to the thermal signal layer 120. The lead 131 is connected to a voltage source (not illustrated) through a control circuit (not illustrated).

The lead 131 is connected to the thermal signal layer 120 though an electric connection, which may be provided in several different ways. According to the embodiment of FIG. 2 there is a conductor 132 devised into the substrate 110. The conductor 132 may be constructed by first providing a hole through the substrate 110 and then introducing electrically conductive material into the hole to connect the lead 131 and the electrode 122. The electrically conductive material may be a lead that is soldered or otherwise bonded between the lead 131 and the electrode 122 or it may be a crimp or pin. If the lead 131 printed onto the surface of the substrate 110, the same printing technique may be used to fill the channel extending through the substrate to fill the channel.

Figure 3:
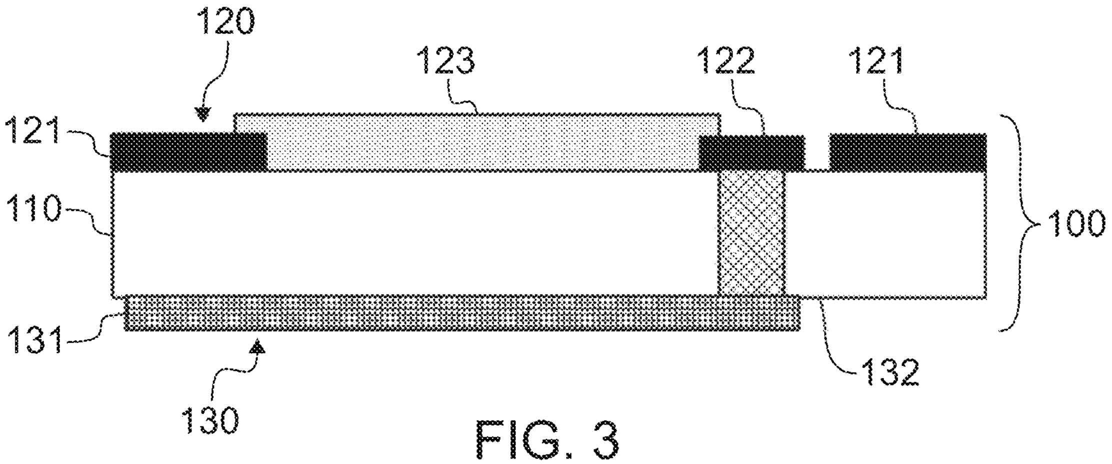
FIG. 3 illustrates a schematic cross-sectional view of a section of a multi-layer structure in accordance with at least some embodiments of the present invention.

According to the embodiment shown in FIG. 3, which is the schematic cross-sectional illustration of FIG. 7, the electrically resistive element 123 connects the electrodes 121, 122 along the substrate 110. The thermal signal layer 120 is powered similarly to the embodiment of FIG. 2. The electrically resistive element 123 may be printed or coated or painted. The electrically resistive element 123 may have electrical resistivity higher than that of the electrical connectors. The electrically resistive element 123 may be produced in various shapes and thicknesses, wherein the cross-section determines the resistivity level. The electrically resistive element 123 may be made of temperature self-regulating material, wherein the material changes as a function of temperature, thus making the element a self-regulating heater element.

Figure 4:
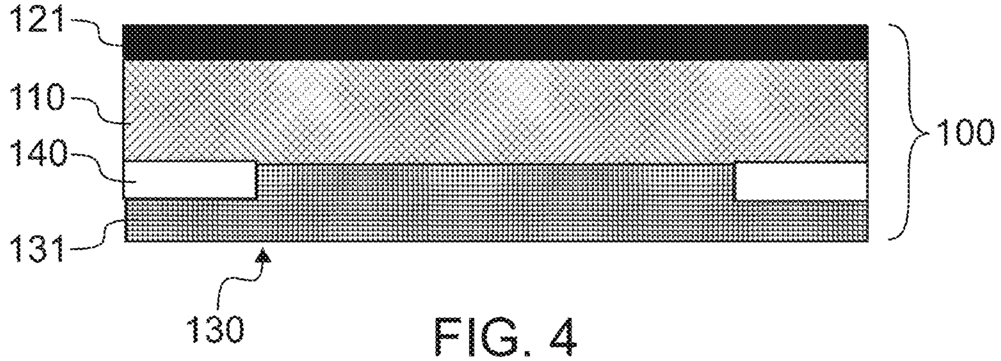
FIG. 4 illustrates a schematic cross-sectional view of a section of a multi-layer structure in accordance with at least some embodiments of the present invention.

FIG. 4 shows an alternative to powering the thermal signal layer 120, wherein the substrate 110 is made of or doped with conductive material. It follows that the lead 131 is electrically connected to the thermal signal layer 120 on areas which are not isolated. To isolate the thermal elements from each other, electric isolators 140 are provided between the lead 131 and the substrate 110. Accordingly, the electric isolators 140 are provided in a pattern which forms the pattern of the array of thermal elements, whereby the pattern of the thermal elements may be formed without patterning the thermal signal layer 120 because only some sections of the thermal signal layer will be provided with a control voltage. Accordingly, the thermal signal layer 120 may include a solitary electrode 121. The electric isolators 140 may be provided by provision of an air gap between the lead 131 and the substrate 110 or printed layer of dielectric material or a laminated membrane, for example.

Figure 5:
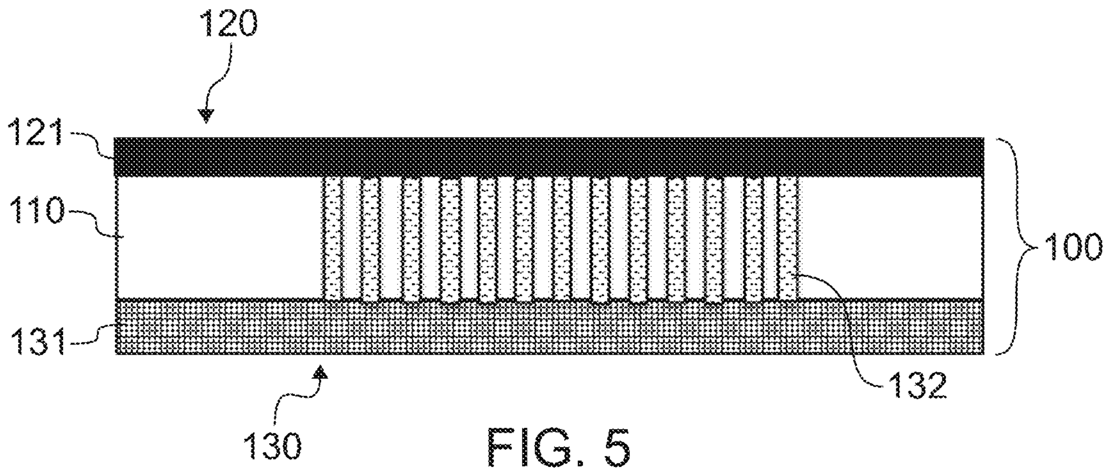
FIG. 5 illustrates a schematic cross-sectional view of a section of a multi-layer structure in accordance with at least some embodiments of the present invention.

FIG. 5 shows yet an alternative to powering the thermal signal layer 120, wherein the electrically non-conductive substrate 110 is provided with channels that extend through the substrate and which have been filled with or provided with conductive material. Such channels may be produced by punching, drilling, laser, or etching, such as dry etching, for example. By providing the conductive channels in a particular pattern, the pattern of the thermal elements may be formed without patterning the thermal signal layer 120 because only some sections of the thermal signal layer will be provided with a control voltage. Alternatively metallic or other conductive particles may be pressed locally inside the otherwise non-conductive substrate 110 to establish conductive passages through the substrate.

In the example of FIG. 1 the functional thermal signal layer 120 and the functional radar signal layer 150 as physically separate layers on opposing sides of the substrate 110. According to alternative embodiment, however, the functional thermal signal layer 120 and the functional radar signal layer 150 are provided in a single physical layer of a metallic film. Should the thermal and radar response be provided with a single layer, it is advantageous to maximize the coverage of the multi-layer structure 100 with the material making up the layer to maximize the radar response. For that purpose, the coverage of the layer is 50 percent or more, particularly 75 or more, preferably in the range of 90 to 100 percent. The single layer embodiment may be constructed, for example, according to any one of the examples shown in FIGS. 2 to 8 provided that the material making up the thermal signal layer 120 is thick and conductive enough to produce the required radar response.

According to another embodiment, the multi-layer structure comprises a separate physical radar signal layer or several physical radar signal layers, wherein the artificial target device includes one or several sections that provide(s) (a) weaker radar response(s) and one or several section(s) that provide(s) (a) stronger radar responses to mimic objects with comparable properties. Examples of such objects include bunkers, anti-aircraft pits, etc.

The manufacturing of the multi-layer structure 100 may be achieved by employing techniques used for printed electronics to achieve relatively large areas for the functional thermal signal layer 120 and radar signal layer 150. According to one embodiment a substrate 110 is unrolled from a roll of raw material and printed with conductive ink on one side of the substrate 110 to produce the thermal signal layer 120. The conductive ink may be carbon ink or silver ink, or more specifically particulate or nano-particulate metal or carbon ink or with ink containing carbon or metal fibers or flakelets. The printing enables a relatively accurate and sharp pattern of the thermal elements 200. Alternatively, the thermal signal layer 120 is printed as a blank layer of material which is then patterned through subtraction, such as mechanical or chemical subtraction. The patterning may also produce the electrically resistive element 123 or they may be added in a separate step by printing, such as offset, flexo, gravure, screen printing, rotary screen printing, ink-jet-printing, or by dispensing.

The driving layer 130 is produced by printing, or by patterning of metal foil using laser, cutting or wet- or dry-etching or laminated in a form of pre-patterned foil.

If the functional thermal signal layer 120 and radar signal layer 150 are produced as separate physical layers, the radar signal layer 150 is added onto the substrate 110 or pre-produced physical thermal signal layer 120. If the radar signal layer 150 is layered onto the pre-produced physical thermal signal layer 120, an intermediate step of providing an electric isolator film there between is conceivable. In the provision of the radar signal layer 150 there are several alternatives to consider. A metallic film is provided. A layer of adhesive, such in the form of a sprayed, rolled, or transplantable film, is applied onto the metallic film, onto the substrate 110, or onto the thermal signal layer 120, in which case the layer of adhesive forms the isolating intermediate electric isolator film. The metallic film is then laminated onto the substrate 110 or onto the thermal signal layer 120 through the layer of adhesive. Alternatively the metallic film may be evaporated, coated, printed, or mechanically affixed, such as stapled, onto the the substrate or onto the thermal signal layer.

The multi-layer structure 100 may be provided with a visual deception layer 160. The visual deception layer 160 may be applied to the thermal signal layer 120 or radar signal layer 150 by painting, laminating, applying a textured wrap or foil, or any detailed mask observable with the human eye.

With the multi-layer structure 100 ready, it is attached to a frame which is constructed to resemble the 3D shape of the portrayed object. The multi-layer structure 100 is preferably made from pliable materials that can withstand deformation enough to facilitate bending so as to conform to the shape of the frame. It is particularly useful to be able to wrap the frame with a sheet-like multi-layer structure 100. Finally, the artificial target device is provided with an electric power source and control processor with the required data transfer interfaces, such as wired or wireless remote connection data interface, to control the temperature of the thermal elements 200 according to a set of computer readable instructions accessed by the control processor. The processor may be connected to a power output stage. A human-machine interface may also be included to control device.

The use of the decoy device is relatively straight-forward. First, an infra-red image of the object is acquiring for processing. The infra-red image is converted into a digital image which comprises pixels. The pixels are then converted into machine readable control instructions for controlling the thermal signal layer 120 to reproduce or mimic the thermal signature of the object. Said control instructions are stored to a local memory comprised by the artificial target device or to a memory that is external to and retrieved by the artificial target device through a wired or wireless interface. A processor comprised by the device reads said control instructions and controls the artificial target device to provide a different voltage, current, or duty cycle to at least two individual thermal elements 200 in the array to form the desired thermal signature.

Further disclosures are made hereafter as clauses.

Clause 1: A multi-spectral artificial target device for producing a deceptive thermal and radar signature of an object, comprising a multi-layer structure (100) which comprises a substrate (110) and a functional thermal signal layer (120), which is provided directly or indirectly on the substrate (110) and which comprises electrically conductive material arranged to form an array of independently controlled thermal elements (200), wherein each thermal element (200) is configured to output a thermal signal, which is observable in the infra-red spectrum, upon exposure to a control voltage, wherein a functional radar signal layer (150) which is provided directly or indirectly onto the substrate (110), which radar signal layer (150) is configured to output a radar response signal, which is observable in the radio frequency spectrum, upon exposure to an external radar stimulus or excitation.

Clause 2: The device according to clause 1, wherein the substrate (110) is made of pliable material capable of being shaped onto or around a frame.

Clause 3: The device according to clause 1 or 2, wherein the thermal signal layer (120) is patterned to include electrically resistive elements (123) or comprises additional electrically resistive elements (123) between sections of the electrically conductive material to provide for the array of thermal elements (200).

Clause 4: The device according to clause 3, wherein each thermal element (200) comprises a first electrode (121) and a second electrode (122), wherein the first electrode and the second electrode (122) are connected by the electrically resistive element (123).

Clause 5: The device according to any one of the preceding clauses, wherein the thermal signal layer (120) comprises electrically non-conductive sections (124) between thermal elements (200).

Clause 6: The device according to any one of the preceding clauses, wherein the structure (100) comprises a driving layer (130), which is provided directly or indirectly on a side of the substrate (110) opposing the thermal signal layer (120), which driving layer (130) comprises an electrically conductive lead (131), and wherein the structure (100) comprises a conductor (132), which extends through the substrate (110) and provides an electrical connection between the lead (131) and the thermal signal layer (120).

Clause 7: The device according to clause 6, wherein the conductor (132) comprises a plurality of electrically conductive channels extending through the substrate (110) such patterned to provide for the array of thermal elements (200) or electrically conductive material embedded into the substrate material.

Clause 8: The device according to any one of the preceding clauses, wherein the radar signal layer (150) comprises a metallic film that has a radar reflectance different to, particularly greater than, that of the thermal signal layer (120) or substrate (110) or both.

Clause 9: The device according to any one of the preceding clauses 3 to 8, wherein the radar signal layer (150) is patterned to match the pattern of thermal elements (200) on the thermal signal layer (120).

Clause 10: The device according to any one of the preceding clauses, wherein the structure (100) comprises a visual deception layer (160) provided onto the radar signal layer (150).

Clause 11: The device according to any one of the preceding clauses, wherein the artificial target device comprises one or more such structures (100), a frame for supporting said one or more structures (100), and control circuitry which is configured to individually control the temperature of the plurality of thermal elements (200) in the structure(s) (100).

Clause 12: A method of producing a multi-spectral artificial target device for producing a deceptive thermal and radar signature of an object, the method comprising (a) providing a multi-layer structure (100), which comprises (a1) providing a substrate (110) and (a2) providing a thermal signal layer (120) by (a2.1) depositing electrically conductive material onto the substrate (110) to form an array of independently controlled thermal elements (200) (a3) providing a radar signal layer (150), which comprises (a3.1) providing a metallic film (a3.2) attaching the metallic film onto the substrate (110) or onto the thermal signal layer (120).

Clause 13: The method according to clause 12, in which deposition step (2.1) the method of depositing is printing.

Clause 14: The method according to clause 12 or 13, wherein the attachment (a3.2) of the metallic film comprises (a3.2.1) providing an adhesive film onto the substrate (110), the thermal signal layer (120), or onto the metallic film, and (a3.2.2) laminating the metallic film onto the substrate (110) or onto the thermal signal layer (120) through the adhesive film.

Clause 15: The method according to any one of the preceding clauses 12 to 14, wherein the provision (a2) of the thermal signal layer (120) comprises (a2.2) patterning the electrodes (121, 122)—and optionally the electrically resistive element (123)—onto the thermal signal layer (120) through subtraction, particularly mechanical or chemical subtraction.

Clause 16: The method according to any one of the preceding clauses 12 to wherein the provision (a) of the multi-layer structure comprises (a4) providing a visual deception layer (160) onto the radar signal layer (150).

Clause 17: The method according to any one of the preceding clauses 12 to 16, wherein the method comprises (b) providing a frame, and (c) attaching the multi-layer structure (100) onto the frame.

Clause 18: The method according to clause 17, wherein the attachment step (c) comprises bending the multi-layer structure (100) at least partially around the frame.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Feature |
|---|---|
| 100 | structure |
| 110 | substrate |
| 120 | thermal signal layer |
| 121 | first electrode |
| 122 | second electrode |
| 123 | resistive element |
| 124 | non-conductive section |
| 130 | driving layer |
| 131 | lead |
| 132 | conductor |
| 140 | electrical isolator |
| 150 | radar signal layer |
| 160 | visual deception layer |
| 200 | thermal element |

CITATION LIST

U.S. Pat. No. 4,524,386 A

The invention claimed is:

1. A multi-spectral artificial target device for producing a deceptive thermal and radar signature of an object, comprising a multi-layer structure which comprises:

a substrate;

a functional thermal signal layer, which is provided directly or indirectly on the substrate and which comprises electrically conductive material arranged to form an array of independently controlled thermal elements, which thermal signal layer comprises electrically non-conductive sections between the thermal elements, wherein each thermal element is configured to output a thermal signal, which is observable in the infra-red spectrum, upon exposure to a control voltage, and a functional radar signal layer which is provided directly or indirectly onto the substrate, which radar signal layer is configured to output a radar response signal, which is observable in the radio frequency spectrum, upon exposure to an external radar stimulus or excitation.

2. The device according to claim 1, wherein the substrate is made of pliable material capable of being shaped onto or around a frame.

3. The device according to claim 2, wherein the thermal signal layer:

is patterned to include electrically resistive elements, or comprises additional electrically resistive elements between sections of the electrically conductive material to provide for the array of thermal elements.

4. The device according to claim 3, wherein each thermal element comprises:

a first electrode, and a second electrode, wherein the first electrode and the second electrode are connected by the electrically resistive element.

5. The device according to claim 1, wherein the thermal signal layer:

is patterned to include electrically resistive elements, or comprises additional electrically resistive elements between sections of the electrically conductive material to provide for the array of thermal elements.

6. The device according to claim 5, wherein each thermal element comprises:

a first electrode, and a second electrode, wherein the first electrode and the second electrode are connected by the electrically resistive element.

7. The device according to claim 5, wherein the radar signal layer is patterned to match the pattern of thermal elements on the thermal signal layer.

8. The device according to claim 1, wherein the multi-layer structure comprises:

a driving layer, which is provided directly or indirectly on a side of the substrate opposing the thermal signal layer, comprising an electrically conductive lead, and a conductor, which extends through the substrate and provides an electrical connection between the lead and the thermal signal layer.

9. The device according to claim 8, wherein the conductor comprises:

a plurality of electrically conductive channels extending through the substrate such patterned to provide for the array of thermal elements, or electrically conductive material embedded into the substrate material.

10. The device according to claim 1, wherein the radar signal layer comprises a metallic film that has a radar reflectance greater than that of at least one of:

the thermal signal layer and substrate.

11. The device according to claim 1, wherein the multi-layer structure comprises a visual deception layer provided onto the radar signal layer.

12. The device according to claim 1, wherein the artificial target device comprises:

one or more such multi-layer structures, a frame for supporting said one or more multi-layer structures, and control circuitry which is configured to individually control the temperature of the plurality of thermal elements in the multi-layer structure(s).

* * * * *